June 23, 1964  E. S. SHARP  3,137,960
FISH LURE
Filed April 11, 1962
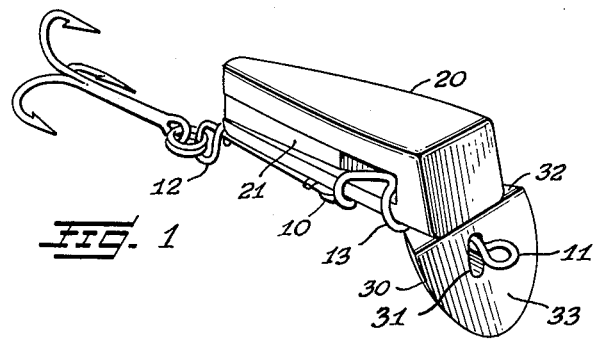
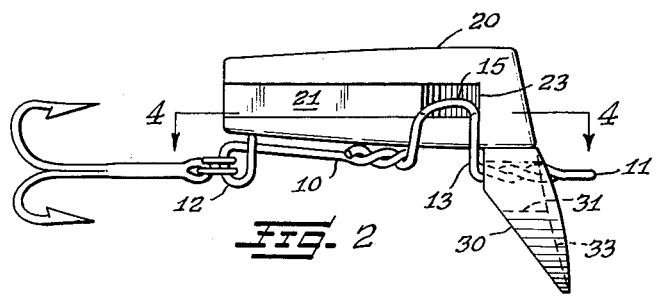
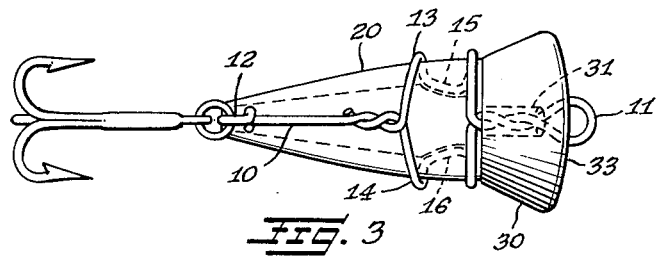
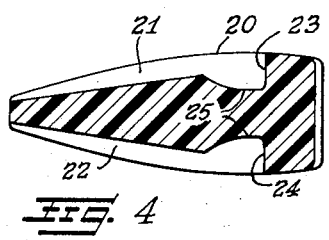
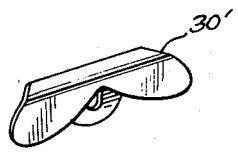
Inventor
Edward S. Sharp
By Edward L. Amonette
Agent

United States Patent Office 3,137,960
Patented June 23, 1964

3,137,960
FISH LURE
Edward S. Sharp, 1220 Muriel NE., Albuquerque, N. Mex.
Filed Apr. 11, 1962, Ser. No. 186,666
3 Claims. (Cl. 43—42.09)

My invention relates to fish lures, and more specifically to fish lures of the plug type having separable body, harness, and resistance members.

In the course of fishing a fisherman frequently must change the type of lure used until he finds the one most attractive to the fish. In the past this has been a troublesome job, particularly where lures of the plug type are used, requiring the fisherman to carry with him a wide assortment of bulky lures, and further requiring the complete removal of the old lure from the line and its replacement by a new one. If bait is used in conjunction with the lure, it is then necessary to apply new bait to the hook on the new lure, thus wasting the bait already on the hook of the old lure.

It is a general object of my invention to provide a fish lure of the plug type in which the size, color, shape, consistency, density, and action are easily varied in the field by the fisherman, in most instances without disconnecting the line, and in all instances without baiting a new hook.

Another object of my invention is to provide a fish lure of the plug type having interchangeable parts which are economically and easily manufactured and which is available to the fisherman at a lower cost than the multiplicity of conventional lures necessary to provide the same variety of presentation.

Briefly my invention accomplishes these and other objects to become apparent by means of a wire harness capable of receiving a line at one end and a hook at the other and including divergent spring arms which removably grasp a grooved body from below. The grooves are notched at a forward location so that the harness is locked on the body in the using position. At the forward end of the lure an optional resistance member is held between the harness and the body, extending below the body to influence motion of the lure in water. When used the resistance member is removable only after separation of the body from the harness. It is my intention that one harness be used with a variety of bodies and resistance members to meet the requirements of the fisherman.

A better understanding of my invention may be had by reading the more detailed description to follow in conjunction with the appended claims and the attached drawing, in which:

FIG. 1 is a pictorial view of a preferred embodiment of my invention;

FIG. 2 is a side view of the same embodiment;

FIG. 3 is a bottom view of the preferred embodiment;

FIG. 4 is a sectional view of the body, taken along the line 4—4 of FIG. 2; and

FIG. 5 shows an alternate resistance member.

Referring now to the drawing, harness 10 is seen to be made of twisted wire, including a line-receiving means in the form of a horizontally disposed loop 11 at its forward end, and a hook-receiving means in the form of a vertically disposed loop 12 at its rearward end. The harness is transversely bifurcated intermediate the ends, with divergent spring arms 13 and 14 ending in a pair of spring detents 15 and 16 which extend into grooves 21 and 22 of body 20 at location 25, where the transverse intergroove spacing is constricted.

Body 20 may be made of plastic or other suitable material in a variety of sizes, shapes, weights, densities, colors and consistencies. Variations in these qualities will affect the action of the lure and its appearance to the fish. Regardless of these variations, the body will always include longitudinal grooves 21 and 22 on its two sides, the grooves ending abruptly at shoulders 23 and 24 near the forward end of the body. The grooves are notched just rearward of their abrupt ends at location 25, at which point spring detents 15 and 16 are releasably engaged with the body. It is seen that the harness 10, when engaged in location 25, prevents relative rearward movement of the body due to pressure of water against its forward end, and prevents relative forward movement of the body due to reasonable pressures during use. However, when it is desired to remove the body from the harness, it may be moved forward relative thereto, spreading detents 15 and 16 apart as they slide rearward from location 25 in grooves 21 and 22.

Resistance member 30 includes an aperture 31 which may be oval in shape with its major axis perpendicular to the orientation of loop 11. The first portion 32 of resistance member 30 is shaped to make close contact with the bottom of the forward end of body 20, the distance between portion 32 and the upper inside surface of aperture 31 being such that resistance member 30 is firmly gripped between harness 10 and body 20. This type of construction adds lateral stability to the resistance member, causing it to act as an integral part of body 20. The second portion 33 of resistance member 30 extends downward, offering resistance of the lure to movement through the water and thereby influencing movement of the lure according to the shape of the resistance member. It is seen most clearly in FIG. 3 that the outside diameter of loop 11 is greater than the minor diameter of aperture 31, preventing removal of resistance member 30 unless it is turned at right angles to its normal position, so that the major diameter of the aperture is in line with the loop 11. Removal is possible only while body 20 is separated from harness 10.

Resistance member 30' shown in FIG. 5 is illustrative of the large variety of shapes in which the resistance member may be made depending on the type of lure action desired. It is apparent that the resistance member may be omitted, still retaining an effective lure. Although only one shape of body 20 has been shown, it will be left to the imagination of those skilled in the art to change the shape from that of the preferred embodiment, and to employ various materials to achieve the desired effect of color, shape, consistency, density, and size without departing frfom the sphere and scope of the invention as described in the claims below.

I claim as my invention:

1. A fish lure of the plug type, comprising:
    a body having harness-receiving longitudinally grooved sides, the transverse intergroove dimension being constricted at the forward part of the body;
    a harness disposed beneath the body and having divergent spring arms embracing a portion of the body between the bottom and the grooves, the ends of said arms including detents extending into said grooves at the constriction, said harness having line-receiving means extending forwardly beyond the body, and further having means for receiving a hook;
    and an apertured resistance member fitted over the line-attaching means, a first portion of the resistance member extending between the harness and the under side of the body for transverse stability, and a second portion extending forward and below the body to influence motion of the lure in water.

2. A fish lure of the plug type comprising:
    a body having a longitudinal groove on each side ending abruptly near the forward end of the body, said grooves being notched just rearward of the abrupt ends;

a harness located beneath the body, extending forward to a line-receiving means and rearward to a hook-receiving means, said harness having upwardly and inwardly extending bifurcations, each bifurcation ending in a spring detent releasably engaged with the notch of one of said grooves;

and an apertured resistance member fitted over the line-attaching means, a first portion of the resistance member extending between the harness and the under side of the body for transverse stability, and a second portion extending forward and below the body to influence motion of the lure in water.

3. A fishing lure of the plug type comprising:

a body having a longitudinal groove on each side ending abruptly near the forward end of the body, with a constricted transverse intergroove spacing just rearward of the abrupt ends;

a harness located beneath the body, extending forward to a line-receiving means and rearward to a hook-receiving means, said harness having upwardly and inwardly extending bifurcations releasably engaging the groove at the point of constriction;

and a resistance member having a first portion held between the underside of the body and the harness forward of the bifurcation, and a second portion extending forward and downward therefrom, said resistance member being removable only after separation of the harness from the body.

References Cited in the file of this patent

UNITED STATES PATENTS

| | | |
|---|---|---|
| 2,482,466 | Cooper | Sept. 20, 1949 |
| 2,590,633 | Lucas | Mar. 25, 1952 |
| 2,715,590 | Carpenter | Aug. 23, 1955 |
| 3,091,883 | Hufford | June 4, 1963 |